United States Patent
Bendiks et al.

(10) Patent No.: US 9,789,911 B2
(45) Date of Patent: Oct. 17, 2017

(54) ROOF FRAME AND METHOD FOR PRODUCING A ROOF FRAME

(71) Applicant: Daimler AG, Stuttgart (DE)

(72) Inventors: Michael Bendiks, Plochingen (DE); Stefan Hummel, Huefingen (DE); Manfred Kempf, Vogt (DE); Thomas Rudlaff, Stuttgart (DE); Lutz Storsberg, Calw (DE); Juergen Thalemann, Steinheim (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/761,898

(22) PCT Filed: Dec. 11, 2013

(86) PCT No.: PCT/EP2013/003746
§ 371 (c)(1),
(2) Date: Jul. 17, 2015

(87) PCT Pub. No.: WO2014/111109
PCT Pub. Date: Jul. 24, 2014

(65) Prior Publication Data
US 2015/0353140 A1      Dec. 10, 2015

(30) Foreign Application Priority Data

Jan. 19, 2013      (DE) .................. 10 2013 000 937

(51) Int. Cl.
B62D 29/00      (2006.01)
B62D 25/06      (2006.01)
B23K 31/02      (2006.01)

(52) U.S. Cl.
CPC ............ B62D 29/001 (2013.01); B23K 31/02 (2013.01); B62D 25/06 (2013.01); B62D 29/005 (2013.01); B62D 29/008 (2013.01)

(58) Field of Classification Search
CPC .... B62D 25/06; B62D 29/001; B62D 29/005; B62D 29/008
(Continued)

(56) References Cited

U.S. PATENT DOCUMENTS 6,408,516 B1      6/2002   Taylor
6,623,068 B2 *    9/2003   Wieschermann .... B62D 23/005
                                                            29/430

(Continued)

FOREIGN PATENT DOCUMENTS

CN         101269621 A        9/2008
DE    10 2008 010 834 A1      8/2009
(Continued)

OTHER PUBLICATIONS

PCT/EP2013/003746, International Search Report (PCT/ISA/220 and PCT/ISA/210) dated Mar. 27, 2014, with partial English translation, enclosing Written Opinion of the International Searching Authority (PCT/ISA/237) Thirteen (13) pages).

(Continued)

*Primary Examiner* — Jason S Daniels
(74) *Attorney, Agent, or Firm* — Crowell and Moring LLP

(57) ABSTRACT

A roof frame for a motor vehicle is disclosed. At least one partial element of the roof frame is massive-formed, preferably forged, from a light metal blank.

5 Claims, 1 Drawing Sheet

(58) Field of Classification Search
USPC .............. 296/187.13, 190.08, 191, 210
See application file for complete search history.

(56) References Cited

U.S. PATENT DOCUMENTS

| | | |
|---|---|---|
| 6,786,538 B1 | 9/2004 | Turk et al. |
| 2009/0174229 A1* | 7/2009 | Ordonio ............... B62D 25/06 |
| | | 296/216.06 |

FOREIGN PATENT DOCUMENTS

| | | |
|---|---|---|
| WO | WO 99/65759 A1 | 12/1999 |
| WO | WO 2012/037606 A1 | 3/2012 |

OTHER PUBLICATIONS

Chinese Office Action issued in Chinese counterpart application No. 201380070760.3 dated May 5, 2016, with partial English translation (Ten (10) pages).

* cited by examiner

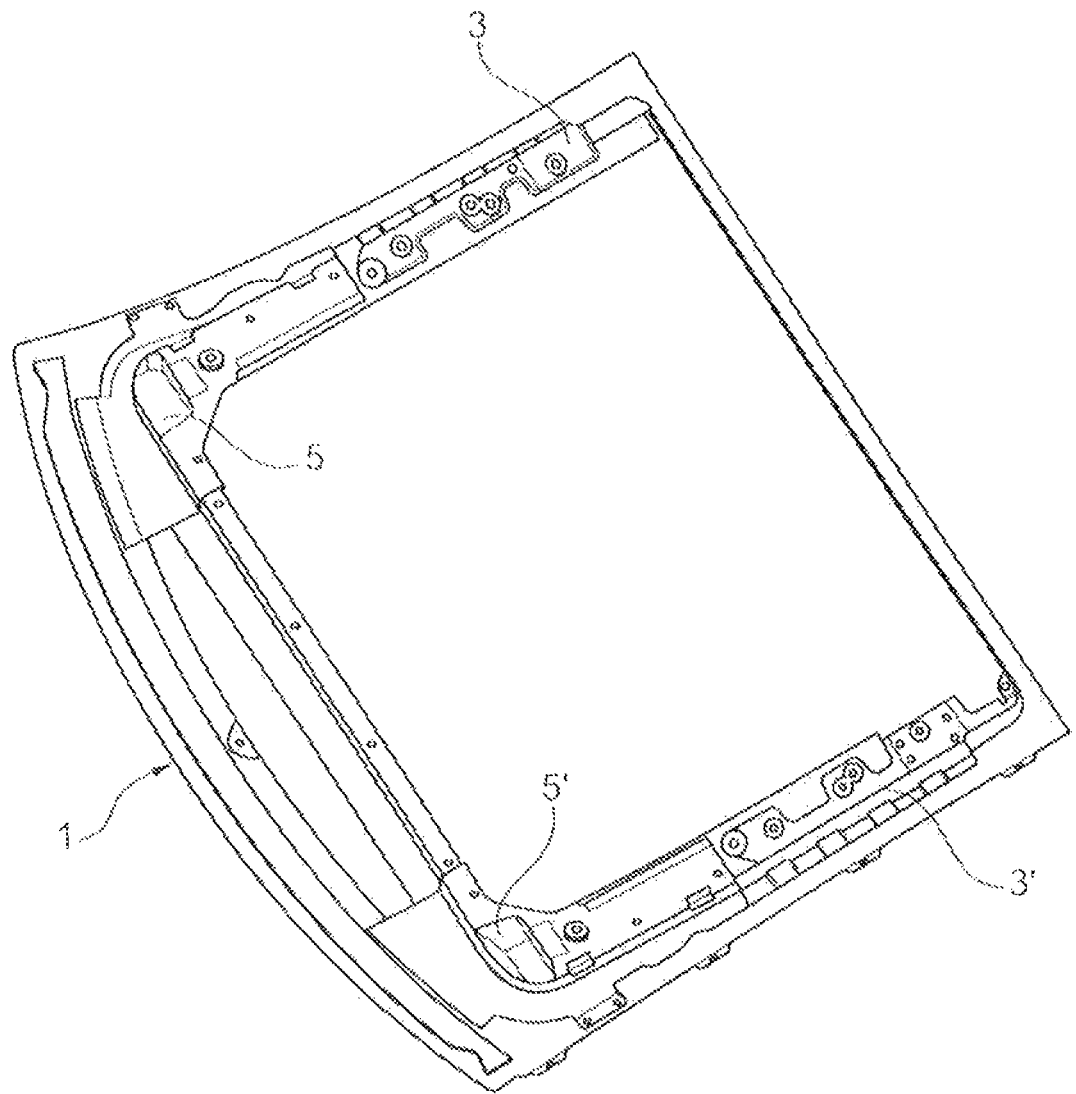

ROOF FRAME AND METHOD FOR PRODUCING A ROOF FRAME

BACKGROUND AND SUMMARY OF THE INVENTION

The invention relates to a roof frame as well as a method for producing a roof frame.

Roof frames and methods for the production thereof are known. A roof frame emerges from DE 10 2008 010 834 A1 which comprises a hat profile-shaped sheet metal profile in which a stiffening structural part made from a lightweight material, for example a fiber-reinforced plastic, is received. Such roof frames which have a mixed construction method from different materials are frequently selected due to high strength and rigidity requirements. Critical joints result herein. If the roof frame is provided for a roof which is able to be opened, problems result during opening or closing of the roof due to different coefficients of thermal expansion, in particular if a particularly high or a particularly low outside temperature is reached. As a rule, additional reinforcement elements are required because the roof frame construction is not sufficiently rigid alone. Overall, relatively complex, heavy structures result which are able to be integrated into an entire shell concept only with difficulty due to the plurality of necessary joining techniques.

The object of the invention is therefore to create a roof frame and a method for the production thereof which permanently withstands high mechanical stresses, at the same time is comparatively light and can be inserted into a shell concept for a motor vehicle in an uncomplicated manner.

The roof frame for a motor vehicle is distinguished in that at least one partial element of the roof frame is massive-formed, preferably forged, from a light metal blank. Therein, the concept of lightweight construction is already taken into account due to the selection of a light metal blank as an initial material for at least one partial element of the roof frame. Furthermore, massive-formed parts and in particular forged components have increased mechanical strength compared to casting components or sheet metal components. This is substantially because a fiber orientation in the component can be suitably designed or influenced during massive forming, in particular during forging, wherein the fibers can be collected, in particular, in regions which hence have a particularly high mechanical stress. Massive-formed, in particular forged, components are advantageous compared to casting components, in particular in places which have a greater wall thickness, because the probability of an inclusion of cavities in a casting component increases with increasing wall thickness. On the other hand, a very homogeneous, highly-compacted structure is generated during massive forming, in particular during forging, without imperfections and cavities, whereby the component obtains its very high mechanical strength.

Due to the high mechanical strength, it is possible to reduce the wall thickness of a massive-formed, preferably forged, component in comparison to a casting component, but also in comparison to a deep-drawn component or sheet metal component, such that a massive-formed or forged component has a lower wall thickness and thus a lower weight than a casting component or sheet metal component made from the same material. This in-turn takes into account the concept of lightweight construction.

Due to the possibility of forming the fiber orientation in the component in a suitable manner during massive forming, in particular during forging, it is possible to form this with discontinuous cross-sectional development according to the stress. Regions with lower mechanical stress therein can be formed to have thinner walls than regions with higher mechanical stress, wherein due to the suitably adjusted fiber orientation, in particular a bundling of fibers in the regions with high mechanical stress, these can be formed with smaller wall thicknesses than is the case for comparable casting or sheet metal components. As well as a reduction of the component weight, a streamlining of the component shape thus occurs in such a way that additional construction space is available in the motor vehicle shell structure. This also enables the creation of new shapes in the design.

Due to the high mechanical strength of the massive-formed, preferably forged, partial elements, additional reinforcement elements are not required, which heavily reduces the plurality of parts and joining operations can be omitted in a procedurally economical manner. Furthermore, a massive-formed, preferably forged, component is able to be connected to adjacent components of the motor vehicle shell structure with all joining techniques without additional effort, wherein the component can, in particular, be welded onto adjacent body or shell parts.

Preferably, the at least one massive-formed or forged partial element of the roof frame has additional functions, for example joining regions, which are provided on the partial element during forging or massive forming, in particular are formed on this. Due to this function integration, it is not necessary to provide components having the corresponding functions because these are already provided in one piece on the at least one massive-formed, preferably forged, partial element of the roof frame. Weight and cost potentials also result due to this.

A roof frame is preferred which is distinguished in that the light metal blank comprises a light metal or a light metal alloy. In particular, it is possible for the blank to comprise aluminum or magnesium or an aluminum alloy or a magnesium alloy. Preferably, the light metal blank consists of one of the materials referred to. Particularly preferably, the light metal blank comprises a wrought alloy which includes aluminum and/or magnesium, wherein it particularly preferably consists of a wrought alloy.

The high mechanical strength which the roof frame obtains by at least one partial element being massive-formed, preferably forged, from a light metal blank, also leads to additional materials, in particular an implementation using a mixed construction method, also being able to be avoided at least as far as possible, preferably completely, such that a material having identical thermal expansion, identical corrosion performance, identical joining techniques to adjacent components and without jumps in properties can be used consistently. At least the massive-formed, preferably forged, partial element can be designed optimally for stresses in an accident situation.

A roof frame is preferred which is distinguished in that it comprises at least two partial elements which are joined to each other, preferably welded to each other. Therein it is possible that at least one partial element of the roof frame is not massive-formed or forged from a light metal blank. It is also possible that at least one partial element includes a material which deviates from at least one other partial element. However, partial elements of the same material are particularly simple to join to one another, in particular to weld.

A roof frame is particularly preferred which is distinguished in that all partial elements of the roof frame are massive-formed, in particular forged. Preferably, all partial elements are massive-formed, in particular forged, from light metal blanks. Hereby, the advantages of the production by massive forming, in particular forging, affect the entire roof frame, wherein this is formed to be particularly light and at the same time with high strength and high mechanical strength.

Alternatively, a roof frame is preferred which is distinguished in that the entire roof frame is produced from a light metal blank in one piece as a massive-formed part, preferably as a forged part. Herein the advantages of the production of the roof frame by means of massive forming, preferably forging, affect the entire roof frame in a particularly distinctive manner. Additionally, a plurality of joining operations are omitted because the roof frame is massive-formed or forged in one piece. Therein, it has, overall, a very high strength, at the same time having a light formation with reduced wall thickness and stream-lined component formation. In particular, a cross-sectional development along the entire roof frame is preferably formed in a discontinuous manner, wherein the roof frame has a larger cross-section in regions with high mechanical stress than in regions with low mechanical stress. Therein, a fiber orientation in the roof frame is adjusted in such a way that the fibers are bundled in the regions with high mechanical stress, such that the roof frame has a very high, in particular an equally high or even higher mechanical strength despite having lower wall thickness and a correspondingly lighter formation in comparison to casting or sheet metal frames. At the same time, the roof frame overall has a highly-compacted, homogeneous structure without faults and cavities.

Finally, a roof frame is preferred which is distinguished by at least one forged in or reforged stiffening inlay. Here, the term "forged in" in particular indicates that the stiffening inlay is reforged completely with the material of a forged partial element or of the entirely forged roof frame, while the term "reforged" indicates that the stiffening inlay is reforged only in regions with the material of the forged partial element or of the entirely forged roof frame. The stiffening inlay preferably comprises fiber-reinforced plastic or high-strength steel elements. Particularly preferably, it consists of these. In particular, it is possible that the fiber-reinforced plastic comprises glass, aramid, basalt or insulated carbon fibers.

In a preferred exemplary embodiment, the stiffening inlay is formed as a profile part. Here, the profiling enables a particularly stable and solid forging in or reforging of the stiffening inlay.

The method for producing a roof frame according to one of the preceding exemplary embodiments is distinguished in that at least one partial element of the roof frame is produced from a light metal blank by massive forming, or by forging. Therein the advantages are implemented which have already been stated in connection with the roof frame.

Preferably, a light metal blank is used which comprises a light metal or a light metal alloy, in particular aluminum or an aluminum alloy, or magnesium or a magnesium alloy, and preferably consists of the materials referred to. In particular, the blank preferably comprises a light metal wrought alloy, wherein it preferably consists of this.

Preferably, at least one partial element of the roof frame is produced by combination forging. This involves the working temperature for the forming preferably being above and subsequently also below a recrystallisation temperature of the processed material. Comparably low dimensional tolerances are able to be presented.

Alternatively, it is preferred that at least one partial element of the roof frame is produced by hot forging. This involves the working temperature during the forming preferably being above a recrystallisation temperature of the material. It is herein advantageous that comparably low forming forces are required. Therein, however, fewer low dimensional tolerances are able to be presented than in the case of combination forging.

Preferably, at least one partial element of the roof frame undergoes a heat treatment, for example a quenching, at least locally, in order to adjust the mechanical properties of the partial element or also of the entire roof frame in a desired manner. In particular, the adaptation of a property profile for the partial element or also the entire roof frame is possible using a suitable and parameterisable heat treatment. In particular, structural changes are hereby caused which affect the mechanical properties, such that these can be influenced by means of the heat treatment.

A method is preferred which is distinguished in that the entire roof frame is massive-formed, preferably forged, from a light metal blank. Alternatively, the roof frame is preferably joined from at least two partial elements. Here, at least one partial element is preferably massive-formed or forged from a light metal blank. Preferably, all partial elements of the roof frame are massive-formed, preferably forged, from light metal blanks. The partial elements can be connected to one another in a non-positive, positive and/or firmly bonded manner, in particular are screwed, welded, hybrid-formed, glued, welded, clinched or joined in another suitable manner. Particularly preferably, however, the partial elements are welded to one another. Due to the fact that at least one of the partial elements, preferably all partial elements, are massive-formed, preferably forged, from a light metal blank, all current joining methods to connect the partial elements to one another are applicable without a problem.

A method is also preferred which is distinguished in that at least one stiffening rib is formed to or formed on, preferably forged to or forged on, at least one massive-formed, preferably forged, partial element of the roof frame. Here, the term "formed to" or "forged to" indicates that during forging, a separate element is connected in a positive, firmly bonded or non-positive manner to the partial element which is formed from the blank, if necessary the entire roof frame. The joint between the two elements is, in this case, caused during massive forming or forging. On the other hand, the term "formed on" or "forged on" indicates that a contour of the stiffening rib, therefore the stiffening rib itself, is formed or produced from the material of the light metal blank during massive forming or forging by forming. In any case, in this manner, local stiffening ribs are able to be presented according to need in a simple manner without additional method steps to at least one partial element of the roof frame, preferably on the entire roof frame.

Finally, a method is preferred which is distinguished in that at least one stiffening inlay is forged at least in regions into at least one forged partial element of the roof frame, preferably into the entire, entirely forged roof frame. Therein, a forging in regions indicates that the stiffening inlay is reforged at least in one region with the material of the partial element or of the roof frame. Alternatively, it is possible that the stiffening inlay is reforged completely with the material of the partial element or of the roof frame. Preferably, a component is used as an inlay which comprises higher or high-strength steel inlays and/or fiber-reinforced plastic, preferably consists of fiber-reinforced plastic. Here, glass, aramid, basalt or carbon fibers are preferably used as reinforcement fibers.

The forging in or reforging of an element formed from a material which differs from the material of the light metal blank in particular indicates that hybrid forging is preferably used in which different elements or components are connected or joined to one another during forging. Herein it is possible to connect the components in a non-positive, positive and/or firmly bonded manner.

The invention is illustrated in greater detail below by means of the drawing.

BRIEF DESCRIPTION OF THE DRAWING

The single FIGURE shows a schematic depiction of one exemplary embodiment of a roof frame.

DETAILED DESCRIPTION OF THE DRAWING

The single FIGURE shows a schematically depicted exemplary embodiment of a roof frame 1 which here is forged entirely in one piece from a light metal blank. Here, it is possible that the roof frame 1 is produced as a single- or double-layer massive-formed or forged light metal component made from a wrought alloy.

The roof frame 1 which is depicted in the FIGURE and is forged in one piece is formed as a sliding roof frame, in particular as a module for a panoramic window which is not depicted. It has guide rails 3, 3' which are provided to guide a sliding mechanism for a sliding roof. Here, it is possible for the guide rails 3, 3' to be forged to the roof frame 1 or to be forged on this. It is also possible that the guide rails 3 are joined to the room frame 1 in a suitable manner, preferably welded to this.

Stiffening elements 5, 5' are provided which can also be formed as stiffening inlays.

The stiffening elements 5, 5' can be joined to the roof frame 1 as separate elements, in particular can be welded to this, screwed, soldered, riveted, glued, clinched or joined to this in another manner.

Alternatively, it is preferably provided that the stiffening elements 5, 5' are forged at least in regions to the roof frame 1 or are reforged with the material of the roof frame 1. It is also possible to forge at least one stiffening element 5, 5' into the roof frame 1. The stiffening elements 5, 5' preferably have fibre-reinforced plastic which is preferably insulated with respect to the light metal for corrosion reasons.

Overall it is shown that the roof frame 1 or the method for the production thereof represents a simple, cost-efficient possibility to operate lightweight construction without compromise with regard to mechanical strength, wherein the roof frame 1 is able to be connected to a motor vehicle shell structure in a time- and cost-saving manner in a simple way using current joining methods.

The invention claimed is:

1. A component part for a motor vehicle, comprising:
a roof frame, wherein an entirety of the roof frame is produced from a light metal blank in one piece as a forged part;
wherein a cross-section of the roof frame is discontinuous such that the roof frame has a first cross-section and a second cross-section, wherein the first cross-section is larger than the second cross-section;
wherein the first cross-section is disposed at a first region of the roof frame, wherein the second cross-section is disposed at a second region of the roof frame, and wherein the first region has a higher mechanical stress than the second region;
wherein the first larger cross-section is formed with at least one stiffening inlay of fibers in a bundled fiber orientation and wherein the second smaller cross-section is not formed with the at least one stiffening inlay of fibers in the bundled fiber orientation.

2. The component part according to claim 1, wherein the light metal blank is a light metal alloy.

3. The component part according to claim 1, wherein the at least one stiffening inlay is a fiber-reinforced plastic and wherein the at least one stiffening inlay is forged to the roof frame or is forged into the roof frame.

4. A method of producing a roof frame, comprising the step of:
producing an entirety of the roof frame by massive-forming, wherein the entirety of the roof frame is forged from a light metal blank;
wherein a cross-section of the roof frame is discontinuous such that the roof frame has a first cross-section and a second cross-section, wherein the first cross-section is larger than the second cross-section;
wherein the first cross-section is disposed at a first region of the roof frame, wherein the second cross-section is disposed at a second region of the roof frame, and wherein the first region has a higher mechanical stress than the second region;
wherein the first larger cross-section is formed with at least one stiffening inlay of fibers in a bundled fiber orientation and wherein the second smaller cross-section is not formed with the at least one stiffening inlay of fibers in the bundled fiber orientation.

5. The method according to claim 4, wherein at least one stiffening rib is forged to or forged into the roof frame.

* * * * *